Feb. 3, 1970   J. C. MORIN   3,492,694
RADIAL EXTRUSION DIE

Filed March 1, 1968   2 Sheets-Sheet 1

INVENTOR
JOSEPH C. MORIN

BY Arnold, Roylance, Kruger & Durkee
ATTORNEYS

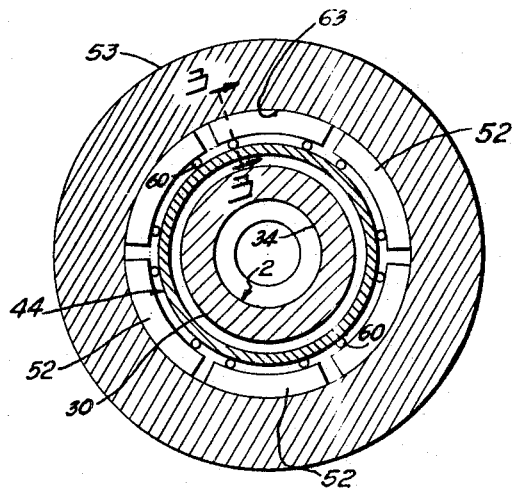
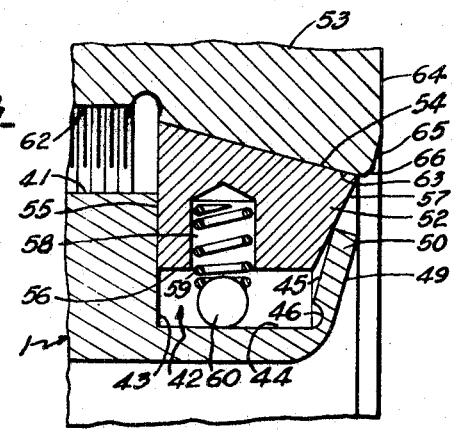
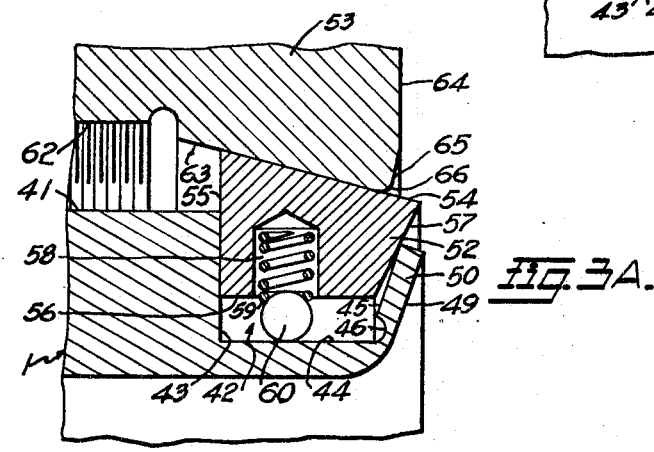

United States Patent Office 3,492,694
Patented Feb. 3, 1970

3,492,694
RADIAL EXTRUSION DIE
Joseph C. Morin, Edmonton, Alberta, Canada, assignor to Cupples Container Company, Austin, Tex., a corporation of Missouri
Filed Mar. 1, 1968, Ser. No. 709,649
Int. Cl. B29d 23/04
U.S. Cl. 18—14        7 Claims

ABSTRACT OF THE DISCLOSURE

Radial extrusion die for production of polymeric sheet, of the type in which the annular die orifice opens radially outwardly, the orifice being defined by an outwardly projecting annular fixed die lip and a cooperating adjustable die lip, the adjustable die lip being resiliently distorted, for adjusting the die gap, by means of a plurality of arcuate segments which in turn are actuated by a single adjusting nut.

---

This invention relates to extrusion dies for polymeric materials, and more particularly to dies of the type having an annular die orifice which opens generally outwardly rather than axially.

In recent years, it has become common practice to produce thermoplastic polymeric sheet material by extruding the polymeric material continuously through a die having an annular orifice, leading off the extruded material in the form of a tube, continuously slitting the tube longitudinally, and converting the slit tube into at least one running web of flat sheet material. Ordinarily, the die employed has had an orifice which opens generally axially, that is, in the haul-off direction of the tube, and the tube is inflated to a diameter substantially greater than the orifice diameter while the polymeric material is still in the plastic state. However, in some cases, and particularly when a foamed thermoplastic material is being extruded, the axial dies have presented difficulties. To overcome these difficulties, it has been proposed to employ an extrusion die in which the annular orifice opens outwardly, in peripheral fashion. Such dies have shown great promise and are often referred to in the trade as "radial dies."

Though radial dies are proving to be increasingly successful, prior art workers have found it difficult to provide such a die in which the die gap can be easily and uniformly adjusted to accomplish precise control of the thickness of the extruded sheet. In most cases, one of the die lips is made in the form of a relatively thin annular plate which is integral with the tubular main die body and can be deformed toward and away from the other die lip. Such deformation requires a considerable force, and prior art radial dies have usually included a relatively large number of adjusting screws, each screw associated with and acting on a different, predetermined angular increment of the annular die lip. This arrangement has not proved entirely satisfactory, however, since adjustment of the relatively large number of screws is a time-consuming and laborious task, and it is exceedingly difficult to achieve such precise adjustment of each screw that the die gap is truly uniform throughout the full annular extent of the orifice.

It is accordingly a general object of the invention to provide a radial extrusion die wherein a precise and uniform adjustment of the die gap can be quickly and easily made.

Another object is to provide such a die wherein adjustment of the die gap over the entire extent of the annular orifice is accomplished by adjustment of a single member.

Stated in general terms, radial dies according to the invention include a mandrel carrying an outwardly projecting, fixed annular die lip; a tubular die body surrounding the mandrel and concentric therewith, so that the mandrel and the body member coact to define a tubular passage for supplying plastified polymeric material to the orifice, the body member having an outwardly opening, transverse, annular groove near its end which is adjacent the fixed die lip, the front wall of this groove being defined by the transverse, annular, outwardly projecting, adjustable die lip; a plurality of generally wedge-like, arcuate segments disposed in the groove in a spaced annular series in such fashion as to be movable radially inwardly in unison to deform the entire adjustable lip uniformly toward the fixed die lip; and a single adjusting nut having an internally threaded portion and an internal, axially tapering camming portion, the internally threaded portion of the adjusting nut cooperating with external threads on the body member in such fashion that, when the nut is turned in one direction relative to the body member, the camming portion of the nut is removed axially in a direction such that the adjusting segments are forced inwardly to deform the adjustable die lip toward the fixed die lip, and, when the nut is turned in the opposite direction, the adjusting segments are allowed to move outwardly under the resilient force applied by the adjustable die lip in its tendency to return to its normal or completely relaxed position.

In order that the manner in which the foregoing and other objects are achieved according to the invention can be understood in detail, a particularly advantageous embodiment thereof will be described with reference to the accompanying drawings, which form a part of this specification, and wherein:

FIG. 2 is a transverse sectional view taken on line 2—2, FIG. 1; and

FIGS. 3 and 3A are fragmentary sectional views taken on line 3—3, FIG. 2, and illustrating parts of the die in two different operative positions.

Figure 1:
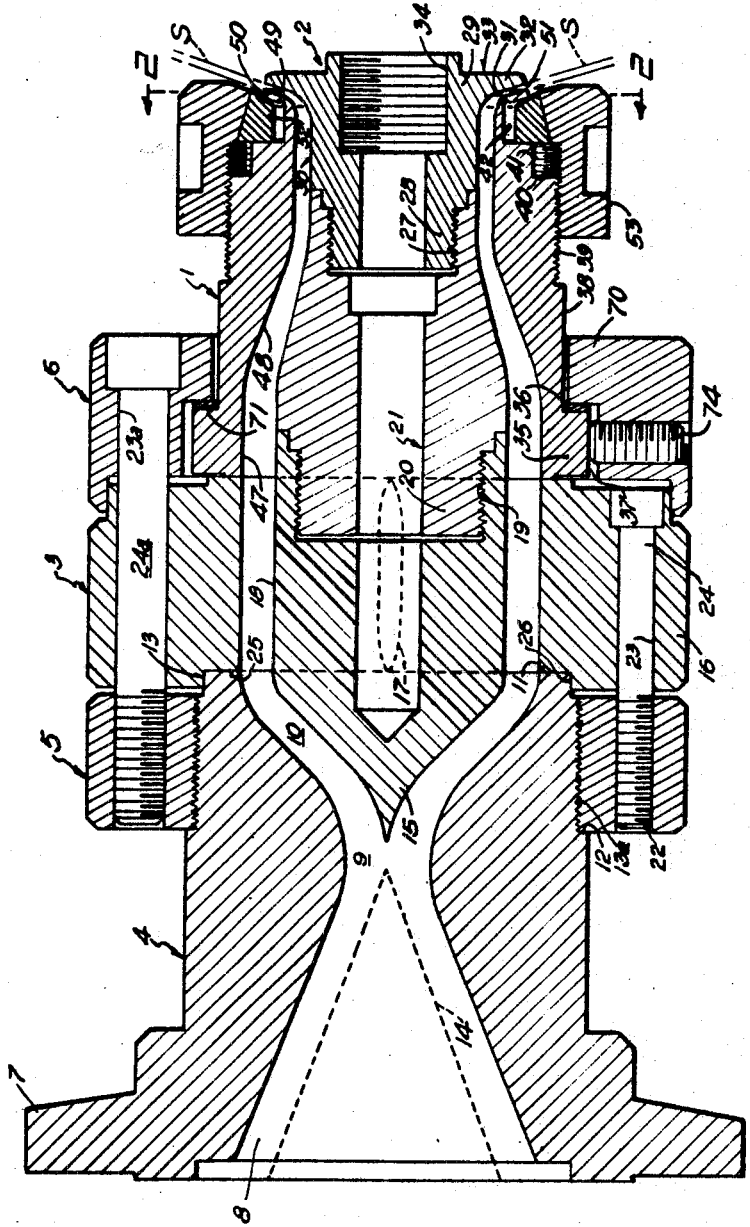
FIG. 1 is a longitudinal sectional view of an extrusion die.

Turning now to the drawings in detail, the embodiment of the invention here illustrated comprises a tubular die body 1, a mandrel assembly indicated generally at 2, a spider body indicated generally at 3, an adapter throat member 4, an adapter flange 5, and a clamping ring 6.

The adapter throat member 4 is constructed to be mounted on the barrel of the conventional extruder (not shown) in such fashion as to receive the flow of heat plastified thermoplastic polymeric material from the extruder. Though the throat member can be mounted on the extruder barrel in any suitable fashion, it is convenient to employ a flange 7 to cooperate with a conventional clamping ring (not shown) which also engages a flange on the extruder in a fashion well known in the art. Throat member 4 defines a through passage including a forwardly and inwardly tapering conical portion 8, an intermediate cylindrical portion 9, and a forwardly and outwardly flaring portion 10, the latter turning forwardly in generally cylindrical fashion as it intersects the flat, transverse, annular front wall 11 of the throat member. Forwardly of flange 7, member 4 has a generally cylindrical outer surface terminating in a forwardly facing, transverse, annular houlder 12. The portion of the outer surface of member 4 commencing at shoulder 12 and extending forwardly therefrom to a point near front face 11 is provided with external threads at 13a to cooperate with the internal threads on adapter flange 5. As seen in FIG. 1, the adapter flange 5 is threaded fully onto the threaded portion of throat member 4 so that the rear face of the adapter flange engages shoulder 12. The front tip of throat member 4 projects forwardly beyond adapter flanges 5 and presents a right cylindrical outer surface 13 of slightly smaller diameter than the externally threaded portion of the throat member.

As indicated in broken lines at 14, the nose of the screw of the extruder extends into the space surrounded by conical nose portion 8 of the passage through throat member 4, the nose and the wall portion 8 being spaced apart and cooperating to define a generally conical passage portion, as shown.

Spider body 3 includes a centrally located torpedo portion 15 disposed concentrically within an outer ring 16 and connected rigidly thereto by two diametrically aligned spider arms 17. The portion of torpedo body 15 which is located within ring 16 presents a cylindrical surface 18 which is interrupted only by the two spider arms and which is concentric with and spaced inwardly from the cylindrical inner surface of ring 16. At its rear end, the torpedo body 15 tapers inwardly and rearwardly presenting a surface which conforms to surface portion 10 of the passage through throat member 4 and is spaced inwardly therefrom and is concentric therewith, so that these two surfaces cooperate to define a forwardly and outwardly tapering tubular passage portion leading directly into the cylindrical passage portion defined by the outer surface of the torpedo body and the inner surface of ring 16. Torpedo body 15 has a central bore 18a which is closed at its rear end and opens forwardly. At the forward end of torpedo body 15, a bore of larger diameter is provided, presenting a cylindrical inner surface 19 which is properly threaded to receive the exteriorly threaded portion 20 of the generally tubular body 21 of mandrel assembly 2.

Adapter flange 5 is provided with a series of circumferentially spaced, longitudinally extending, threaded through bores 22. Ring 16 of spider body 3 is provided with a plurality of through bores 23 equal in number to bores 22 and spaced in a circular series in such manner as to be alignable respectively with bores 23. Alternate ones of the bores 22 are enlarged at their forward ends to accept the heads of screws 24, so that the screws 24 secure the spider body 3 rigidly to throat member 4. Clamping ring 6 also includes a number of unthreaded through bores 23a equal to one half the number of bores 23, all of bores 23a being enlarged at their forward ends to accommodate the heads of longer screws 24a, hte screws 24a extending through both clamping ring 6 and ring 16 and having their threaded end portions engaged in bores 22. Screws 24a thus aid in securing spider body 3 and also serve to secure clamping ring 6 to the spider body. Screws 24 and 24a thus serve to clamp the spider body 3 rigidly on throat member 4 in such fashion that the flat, transverse, annular rear face portion 25 of ring 16 is in flush engagement with the front face 11 of throat member 4. An outer annular portion of ring 16 projects rearwardly beyond face portion 25 and includes a right cylindrical surface 26 which slidably embraces surface 13 of member 4.

Mandrel body 21 projects forwardly from torpedo body 15 and presents an outer surface which is initially cylindrical and of the same diameter as the cylindrical outer surface of the main portion of the torpedo body, and which then tapers, forwardly and inwardly and then again becomes cylindrical, as seen in FIG. 1. At its tip, mandrel body 21 includes an enlarged bore portion 27 which is threaded to cooperate with external threads on the cylindrical rear portion 28 of mandrel nose member 29. Forwardly of portion 28, nose member 29 is of enlarged diameter, so as to present a cylindrical outer surface portion 30 of the same diameter as the cylindrical outer surface portion presented at the tip of mandrel body 21. The outer surface of nose member 29 then curves outwardly so as to smoothly join the rearwardly facing transverse annular surface 31 of the generally transversely extending, circular fixed die lip 32. Rather than being precisely at right angles to the longitudinal axis of the die, surface 31 slants forwardly and outwardly at an angle, for example, of approximately 15°. The front end face 33 of nose member 29 is spaced a significant distance forwardly from surface 31, so that the fixed die lip 32 is rigid and essentially unyieldable under the forces encountered in operation of the extrusion die. Nose member 29 has a through bore 34, threaded at its forward end so as to accommodate a fluid-conveying conduit means (not shown).

Tubular die body 1 includes an outwardly projecting transverse annular rear flange 35 having a transverse annular flat front face 36 and a right cylindrical outer surface 37. Forwardly of flange 35, body 1 has a cylindrical outer surface portion 38 and a cylindrical threaded portion 39. The front end of threaded portion 39 is defined by a tranverse annular forwardly facing shoulder 40. A short cylindrical surface portion 41 extends forwardly from shoulder 40, being of substantially smaller diameter than threaded portion 39. Immediately in front of surface portion 41 is a transverse annular outwardly opening groove 42 having a flat transverse annular rear wall 43, a cylindrical bottom wall 44, and a forwardly and outwardly slanting front wall 45. Rear wall 43 of groove 42 lies in a plane which is at right angles to the longitudinal axis of the die. The cylindrical bottom wall 44 is concentric with that axis. In its normal, relaxed condition, the material forming front wall 45 occupies a position such that the front wall extends parallel to surface 31 of the fixed die lip 32. A continuous annular groove 46 is provided at the juncture between walls 44 and 45, adding resilient flexibility to the material of body 1 at this point.

The inner surface of tubular body member 1 includes a cylindrical rear portion 47 equal in diameter to the inner surface of ring 16 of the spider body. Portion 48 of the inner surface of member 1 then tapers forwardly and inwardly, at a somewhat sharper angle than the corresponding outer surface portion of mandrel body 21. The inner surface of body 1 then again becomes cylindrical until, immediately adjacent the forward tip of the body, the inner surface curves outwardly and smoothly joins a forwardly and outwardly slanting surface portion 49. The material of body 1 lying between the front wall of groove 42 and the forwardly and outwardly slanting surface portion 49 constitutes an adjustable die lip which cooperates with the fixed die lip 32 to define the generally outwardly opening annular die orifice 51. With body member 1 made from stainless steel, for example, die lip 50 is capable of being resiliently deformed, primarily in a bending mode about the circular line provided by groove 46. In its normal, relaxed condition, die lip 50 extends with surface portion 49 parallel to the rearwardly facing surface 31 of the fixed die lip.

Adjustment of adjustable die lip 50 is accomplished by the combination of segments 52 and adjusting nut 53. A plurality (six in this embodiment) of the segments 52 are employed and all of the segments are identical, being formed by cutting from a continuous circular ring of uniform cross sectional configuration. Considering the segments in operative position, each segment includes an outer surface 54 which is a part of a frusto-conical surface and tapers forwardly and inwardly. The rear surface 55 of each segment is flat and disposed to lie in a transverse plane at right angles to the longitudinal axis of the die when the segment is operatively disposed. Inner surface 56 of each segment is part of a cylindrical surface of larger diameter than the bottom wall 44 of groove 42. The front surface 57 of each segment slants forwardly and outwardly and constitutes a portion of a sharply tapering frusto-conical surface. The width of surface 56 is significantly smaller than the width of the mouth of groove 42, while the width of outer surface 54 is larger than the mouth of the groove by such an extent that, when the segment is inserted into the groove, with adjustable die lip 50 in its normal or relaxed position, the peripheral edge of the adjustable die lip engages the front face 57 of the segment at a point near the middle thereof. With the segment and the adjustable die lip in this relative disposition, the front face 57 of the segment diverges rearwardly and inwardly from the front wall of groove 42.

Each segment 52 is provided with two blind bores 58 each located adjacent a different end of the segment and opening radially inwardly with respect thereto. A helical compressing spring is seated in each bore 58, and, in its normal or relaxed position, projects therefrom, inwardly beyond surface 56 of the segment. A spherical metal ball 60 is engaged in the projecting end of each spring 59, the last turns of the end portion of the spring being deformed to slidably embrace and retain the ball. The length of the springs 59, all of which are identical, is such that when the spring is relaxed, the ball 60 will be spaced from the inner surface 56 of the adjusting segment 52 by a distance which is larger than the space between surface 56 and the bottom wall of groove 42 when the segment is lightly engaged between the front and rear walls of the groove, as seen in FIG. 3A. Accordingly, when the segment is positioned as shown in FIG. 3A, the two springs 59 carried by the segment are under light compression. The balls 60 are so retained by the respective springs as to be freely rotatable.

A single adjusting nut 53 is provided in the form of a metal ring which is markedly wider than is groove 42. The inner surface of nut 53 includeds a cylindrical, threaded portion 62 and a smooth frusto-conical portion 63 which tapers inwardly away from portion 62. Threaded surface portion 62 has a width nearly as great as that of the threaded portion 39 of die body 1. The width of frusto-conical surface portion 63 is advantageously at least equal to the width of the outer surfaces 54 of the adjusting segments. The effective diameter of frusto-conical surface portion 63 of the adjusting nut is equal to the diameter of the circle in which the outer surfaces 54 of segments 52 lie when all of the segments are disposed in the groove 42 in the position shown in FIG. 3A. In operative position, nut 53 is disposed with the threads of surface portion 62 engaged with the threads of surface portion 39 of body 1, so that rotation of the nut 53 relative to die body 1 causes the frusto-conical surface portion 63 to move axially across groove 42 in a direction depending upon the direction of such rotation. Frusto-conical surface portion 63 of the nut cooperates with outer surface portions 54 of the segments in camming fashion beuause of the frusto-conical nature of the surfaces. Accordingly, when the nut is rotated in a direction to cause axial movement to the left, as viewed in FIG. 1, all of the segments 52 are forced simultaneously inwardly, further into groove 42, causing the adjustable die lip 50 to be deflected forwardly by action of the front surfaces 57 of all of the segments 52, with the result that the entire die gap 51 is decreased. The amount of decrease of the die gap, with resultant decrease in thickness of the extruded product, depends upon the distance by which the segments are forced radially into the groove 42.

When adjusting nut 53 is rotated in the opposite direction, with the frusto-conical surface portion 63 moving axially forwardly across groove 42, surface 63 is, in effect, moved radially outwardly with respect to surfaces 54, allowing the springs 59 to force segments 52 radially outwardly. Such movement of the segments allows the adjustable die lip 50 to swing rearwardly, away from the fixed die lip, so that the die gap is increased. Such movement of the adjustable die lip occurs because of the inherent resiliency of the metal from which die body 1 is made.

The combination of adjusting nut 53 and segments 52, cooperating with the resiliently deformable die lip 50, is thus operative to provide for adjustment of the die gap between a maximum, occurring when the adjustable die lip is in its relaxed, undistorted condition, illustrated in FIG. 3A, and a minimum, with the minimum depending upon the design parameters, including the extent of axial movement of the nut 53 relative to die body 1 afforded by the cooperating threads of surface portions 39 and 62, the angle of taper of frusto-conical surface portions 54 and 63, and the angles of taper of surface portions 57 and 49.

The forward end of adjusting nut 53 includes a flat transverse annular main face 64 and, adjacent frusto-conical surface portion 63, a chamfer 65 and a rounded edge 66 which joins surface 63 and chamfer 65. The chamfer 65 actually constitutes a frusto-conical surface which tapers sharply rearwardly and inwardly at an angle essentially the same as the angle at which the adjustable die lip 50 tapers when it is in its relaxed, undistorted condition. The disposition of chamfer 65 and rounded edge 66 is such, relative to the frusto-conical camming surface portion 63, that when the die gap is maximum (that is, when the adjustable die lip is in its relaxed, undistorted condition) and adjusting nut 53 is in the proper position, seen in FIG. 3A, to retain the segments 52 without causing them to distort the adjustable die lip, the frusto-conical surface provided by chamfer 65 will be parallel to and spaced slightly rearwardly of the plane in which the front surface of the adjustable die lip 50 lies. Accordingly, the extruded sheet material S can be drawn away from the die orifice continuuosly, in a path aligned with the frusto-conical annular space between the die lips, without coming into sliding engagement with any portion of the adjusting nut 53.

Since, as will be clear from FIG. 2, the segments 52 are rigid and spaced apart by only a relatively small distance, and since the thickness of adjustable die lip 50, taking into consideration the strength of the metal from which it is made, is such that the small gaps between the segments do not cause non-uniform deflection of the adjustable die lip when the segments 52 act to distort the same, the adjustments of the die gap caused by turning the nut 53 are uniform in the sense that the die gap is essentially constant throughout its entire annular extent for any adjusted position.

Ring 16 and torpedo body 15 cooperate to define a right cylindrical tubular through passage which communicates with the tubular passage defined by mandrel body 1, the latter passage in turn communicating directly with the outwardly opening die orifice 51. Accordingly, plastified polymeric material supplied continuously from the extruder barrel passes through the tubular passage of the die and continuously emerges from the die orifice.

Clamping ring 6 has a transverse annular inwardly projecting flange 70 of such diameter as to project inwardly almost into engagement with cylindrical outer surface 38 of die body 1. Hence, the flange 70 of the clamping ring is disposed in front of the outwardly projecting flange 35 of die body 1. A copper gasket or like sealing washer 71 is disposed between flanges 35 and 70. Flange 35 and ring 6, including its flange 70, are so dimensioned that when screws 24a secure the clamping ring in place, flange 70 clamps die body 1 against ring 16 of member 3, and surfaces 11 and 25 are held in flush engagement. Sealing washer 71 is placed under compression by the clamping action of ring 6.

Clamping ring 6 also has threaded radial bores which accommodate adjusting screws 74, the screws being equally spaced in an annular series. The inner ends of screws 74 engage the outer cylindrical surface of flange 35. Accordingly, with the clamping pressure of flange 6 reduced, screws 74 can be manipulated to center body 1 precisely on spider body 3.

While one particularly advantageous embodiment of the invention has been chosen for illustrative purposes, it will be clear to those skilled in the art that various changes and modifications can be made therein without departing from the scope of the invention as defined in the appended claims.

What is claimed is:

1. In an extrusion die for polymeric material, the combination of
mandrel means extending longitudinally of the die and including a transverse annular generally outwardly projecting fixed die lip;
tubular die body means surrounding said mandrel means,
said mandrel means and said die body means being concentric and cooperating to define a tubular passage for conducting extrudable polymeric material longitudinally of the die toward the location of said fixed die lip,
said die body means having at its forward end a transverse annular outwardly opening groove, the front wall of said groove being defined by a transverse annular generally outwardly projecting adjustable die lip which extends beside said fixed die lip and is spaced therefrom, said fixed and adjustable die lips cooperating to define a transverse annular generally outwardly opening die orifice communicating with said passage, said adjustable die lip being capable of being flexed toward and away from said fixed die lip for adjustment of the die gap;
a plurality of arcuate die lip adjusting segments arranged in a circular series with the inner portions thereof disposed in said groove and the outer portions thereof projecting outwardly from said groove,
each of said segments having a rear face, an outer surface, and an inwardly and rearwardly slanting front face,
said segments being so dimensioned that said rear face and said front face of each segment are slidably engaged respectively with the rear wall of said groove and said adjustable die lip; and
an adjusting nut concentric with said passage and having an internally threaded portion engaged with an externally threaded portion of the die in such fashion that rotation of said nut relative to said externally threaded portion causes said nut to move longitudinally of the die,
said nut having an annular cam surface which tapers axially of the die, surrounds said adjusting segments and slidably engages said outer surfaces thereof,
rotation of said nut in one direction relative to said externally threaded portion causing said cam surface to force said adjusting segments inwardly simultaneously to flex said adjustable die lip uniformly toward said fixed die lip.

2. The combination according to claim 1, wherein
said adjustable die lip has a relaxed position in which the die gap is maximum, and
the angle at which said front faces of said segments slant is such that the plane in which said front faces lie intersects the plane of said adjustable die lip when the latter is in said relaxed position.

3. The combination according to claim 2, wherein said adjustable die lip is substantially parallel to said fixed die lip when in said relaxed position.

4. The combination according to claim 2 and further comprising resilient means engaged between each of said adjusting segments and the bottom wall of said groove and operative to bias said segments outwardly.

5. The combination according to claim 4, wherein
each of said segments is provided with two recesses located each adjacent a different end of the segment and opening toward the bottom of said groove,
said resilient means for each of said segments comprises two compression springs, each engaged in a different one of said recesses, and two anti-friction balls each engaged between the bottom of said groove and the adjacent end of a different one of said springs.

6. The combination according to claim 1, wherein
said outer surfaces of said segment are arcuate and each constitute part of a frusto-conical surface which tapers inwardly and forwardly relative to the assembled die, and
said annular cam surface is a frusto-conical surface tapering inwardly and forwardly at at least substantially the same angle as do said outer surfaces of said segments.

7. In an extrusion die for polymeric material, the combination of
mandrel means including a transverse annular generally outwardly projecting fixed die lip;
a transverse annular generally outwardly projecting adjustable die lip extending beside said fixed die lip and cooperating therewith to define a transverse annular generally outwardly opening die orifice;
means surrounding said mandrel means and supporting said adjustable die lip,
said adjustable die lip being resiliently deformable toward said fixed die lip; and
means for deforming said adjustable die lip toward said fixed die lip uniformly over its full annular extent to adjust the die gap, comprising
a plurality of segments spaced in a circular series and each having a forwardly facing cam surface slidably engaged with said adjustable die lip on the side thereof opposite said fixed die lip; and
an adjusting nut having internal threads operatively engaged with external threads on a fixed portion of the die in such fashion that rotation of said nut causes the same to move axially relative to said die lips, said nut having an inwardly and forwardly tapering annular inner surface surrounding and slidably engaging said segments, axial movement of said nut rearwardly relative to the die serving to force all of said segments inwardly simultaneously to deform said adjustable die lip toward said fixed die lip.

References Cited
UNITED STATES PATENTS

| | | |
|---|---|---|
| 2,963,741 | 12/1960 | Longstreth et al. |
| 3,079,636 | 3/1963 | Aykanian. |
| 3,349,435 | 10/1967 | Bosch. |

WILLIAM J. STEPHENSON, Primary Examiner